Oct. 26, 1954     R. I. FELVER     2,692,751

VALVE FOR RUBBER TUBES, SYRINGES, AND THE LIKE

Filed April 24, 1951

INVENTOR.
Richard I. Felver
BY
Oldham & Oldham
ATTORNEYS

Patented Oct. 26, 1954

2,692,751

UNITED STATES PATENT OFFICE 2,692,751

VALVE FOR RUBBER TUBES, SYRINGES, AND THE LIKE

Richard I. Felver, Pittsburgh, Pa.

Application April 24, 1951, Serial No. 222,574

12 Claims. (Cl. 251—342)

This invention relates to valves and, more particularly, to a valve of the ball check type including a flexible valve housing through which the ball can be gripped and manually repositioned to control the flow of fluids.

Heretofore, ball check valves have been used to automatically restrict the flow of fluid through a conduit to movement in one direction—that is, they prevented back flow. Such valves, though simple and effective in normal check valve operation, become considerably more complicated when adapted to positive movement of the ball to open and closed position. Previous attempts to effect positive, manually controlled ball movement have been concerned with mechanical means of various types, including screws, linkages, etc., for lifting the ball off its valve seat against the pressure of the fluid to permit flow around the ball. Because of the necessity for such mechanical ball moving means, previous ball check valves have been too bulky or awkward to incorporate in rubber tubes, syringes, or the like, where an inexpensive and compact valve is desirable.

The general practice heretofore has been to control the flow of fluid through a rubber tube to a syringe or the like by means of an external metal clamp which is adapted to be squeezed or snapped around the tube to shut off the flow of fluid, or to be released to allow the flow. Valves of this type are open to the objection that they often damage the tube, are sometimes hard to operate, and do not provide a very pleasing appearance.

It is the general object of this invention to avoid and overcome the foregoing and other difficulties of and objections to prior art practices by the provision of an improved and less expensive valve which retains the low cost and efficiency of a ball check valve but wherein the ball can be moved to and from an open position without requiring the use of mechanical screws, linkages, or the like, for moving the ball.

Another object of the invention is to provide a valve which can be molded integrally with a rubber tube or syringe.

Another object of the invention is to provide a comparatively simple valve that can be made from rubber or molded plastic with only one moving part.

Still a further object is the provision of a valve which can be molded from a variety of materials for use with various chemical reagents.

Another object of the invention is to provide a ball check valve having a flexible body or housing which can be gripped and flexed to move the ball to open or closed position.

The aforesaid objects of the invention, and other objects which will become apparent as the description proceeds, are achieved by providing a valve structure of the ball check type including a flexible valve body or housing made in the shape of an hour glass including upper and lower bell-shaped compartments joined together by a flattened elliptical throat. Received in the valve housing is an impervious ball, for example of glass, hard rubber, or metal of such size that it can be readily squeezed through said throat. When the ball is in the lower compartment, it seats in the outlet of the valve and cuts off the flow of the fluid through the valve. When the ball is in the upper compartment of the valve, it is held there by the elliptical throat, but because of the elliptical shape of said throat, the ball does not seal against the flow of fluid through the valve.

For a better understanding of the invention, reference should be had to the accompanying drawings, wherein.

Figure 1:
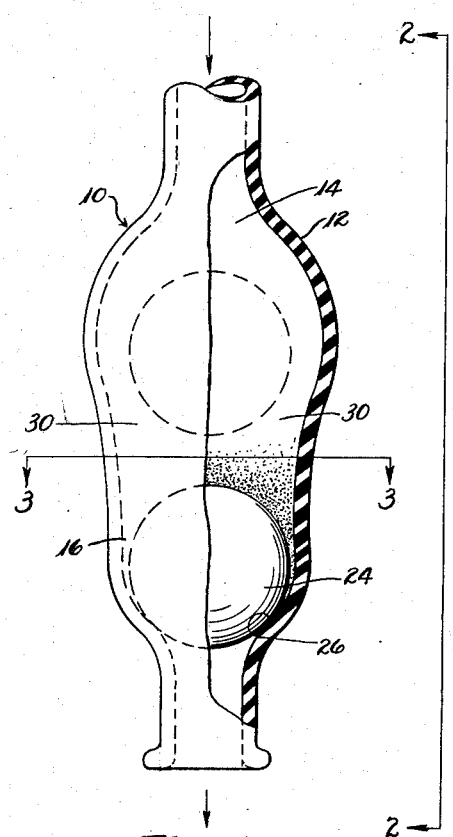
Fig. 1 is a side elevational view, partly in section, of one preferred embodiment of the invention.
Figure 2:
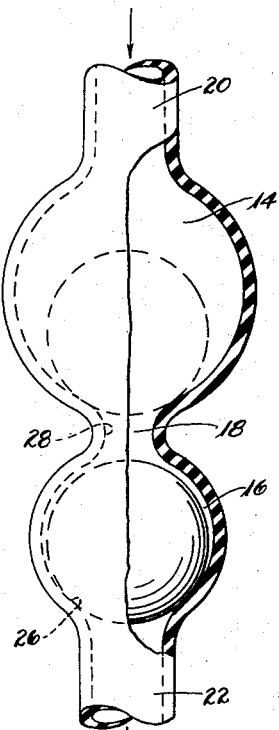
Fig. 2 is a side elevational view, partly in section, of the valve in Fig. 1 rotated through ninety degrees.
Figures 3, 4:
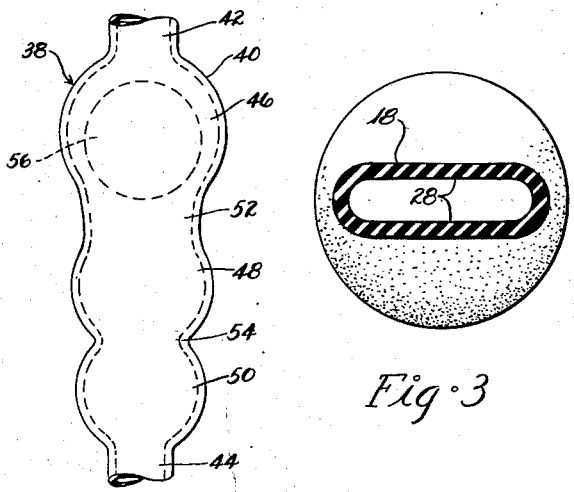
Fig. 3 is a sectional view taken on the line III—III in Fig. 1, showing particularly the elliptical shape of the interconnecting throat portion.
Fig. 4 is an elevational view, partly in section, illustrating another form of the invention.

With specific reference to the form of the invention illustrated in Figures 1, 2, and 3, the numeral 10 indicates generally a valve body or housing having a wall 12 made of flexible and usually resilient material, such as rubber, plastic, or the like. The valve housing is generally in the shape of an hour glass, forming an upper compartment 14, a lower compartment 16, and an interconnecting throat portion 18. The inlet to the valve is provided through a nipple or tube 20 leading into the top of the upper compartment, and the outlet to the valve is provided in the opposite end through the nipple or tube 22 extending from the bottom of the lower compartment.

Within the valve housing 10 is a ball 24, usually of hard rubber or brass, which the operator of the valve can readily feel with his fingers through the flexible rubber valve housing. This ball, in closed or sealing position, normally rests against the spherically conical valve seat or surface 26 formed by the lower compartment wall adjacent the outlet tube or nipple 22. The ball 24 is held against the conical seat 26 by the fluid pressure on the ball, and, with the valve operating in the normal upright position, by the action of gravity on the ball to effect a seal with seat 26 whereby the flow of fluid through the valve is cut off.

To release the valve and restore flow, the ball 24 is squeezed up through the throat 18 into the upper compartment 14 into the position shown in dashed lines in Figures 1 and 2.

If the wall 12 of the valve housing 10 is made of a flexible but non-stretchable material, such as plastic, the size of the ball 24 should be such that its circumference is dimensionally equal to or slightly less than the inside periphery of the throat 18. However, if the wall 12 is made of a flexible and stretchable material, such as rubber, the circumference of the ball may be slightly in excess of the periphery of the throat 18.

Figure 5:
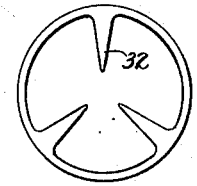
Figures 5 and 6 are modifications of Fig. 3, showing various throat configurations which might be used for interconnecting the two valve compartments.
Figure 6:
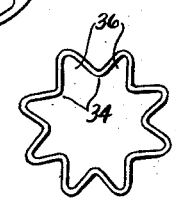

The purpose of the throat 18, and this throat might also be called a shelf, is to confine the ball 24 to the upper compartment 14 in such a manner that it does not stop the flow of fluid through the valve. To achieve this result, any number of configurations are possible, some of which are shown in Figures 3, 5, and 6. With specific reference to Fig. 3, which is the throat configuration used in the preferred form of the invention shown in Figures 1 and 2, the throat 18 is of a flattened elliptical shape. When the ball 24 is in the upper compartment 14 of the valve, it is supported by the flattened walls 28 of the throat 18 (see Fig. 3), preventing the ball from entering compartment 16. The elliptical shape of the throat simultaneously provides open passages 30 (see Fig. 1) on either side of the ball through which the fluid flows.

Instead of the elliptical-shaped throat of Fig. 3, a plurality of flexible or resilient fingers 32 projecting inwardly of the inner wall of the valve may be used to provide a shelf to support the ball 24 when it is in the upper compartment 14, as shown in Fig. 5.

Figure 6 shows another form in which the throat is molded with corrugations in the wall. The inner projections 34 of the corrugated surface act as a shelf to support to the ball 24 while the inner spaces 36 permit the flow of fluid past the ball.

Even though it is believed the operation of the apparatus will be apparent from the foregoing description, a brief review thereof will now be made for purposes of summary and simplification. Assume the ball 24 is in the lower compartment 16. In this position, it seals against the conical seat 26 to cut off flow of fluid through the valve. Compartment 16 is usually so constructed that the ball 24 does not touch the wall at any other point than along the conical seat 26. This permits limited free movement of the ball 24 within the compartment 16, and is of value to the operator if he desires to pass small amounts of fluid through the valve. Thus, the operator merely grips the valve housing below the ball near the seat 16 or tube 22 and by a light squeeze or inward pressure against the ball through the flexible valve wall 12, the ball 24 is easily unseated (in the absence of high fluid pressure), permitting fluid to seep by. When the operator releases his grasp, the ball 24 immediately reseats itself and cuts off further flow of the fluid.

If a continuous flow through the valve is desired, the ball 24 is squeezed up through the throat 18, by manipulation of the operator's fingers, into the upper compartment 14, where it is held by the walls 28 of the elliptical throat. In this position, the continuous flow of fluid can by-pass the ball 24 through the passages 30. To cut off the flow, the operator has merely to squeeze the ball 24 through the throat 18 back down into compartment 16, where it again seats itself on the conical seat 26 to stop the flow through the valve.

Fig. 4 shows another form of the invention in which the numeral 38 indicates generally a valve having walls 40, an inlet 42, and an outlet 44. The valve in this form of the invention has three compartments—46, 48, and 50, with intermediate throats 52 and 54 connecting the compartments. The valve 38 in Fig. 4 is identical to that of the valve of Fig. 1 both in structure and function insofar as compartments 46 and 48 and throat 52 are concerned. Valve 38 differs, however, in the addition of a third compartment 50 which is molded with an inner surface diameter approximately equal to the diameter of the ball 56. When the ball 46 is squeezed into compartment 50, it is held securely in sealing position. This additional feature is particularly desirable where the valve is used in portable equipment or the like, where the valve is subject to vibrational movement, tilting, or inversion. The intermediate compartment 48 is usually still desirable in such instances to permit ready use of the valve for the passage of small amounts of fluid as above described. If this feature of the invention is not desired, then compartment 48 may be omitted from the form of the invention of Fig. 4.

It will be recognized that the objects of the invention have been achieved in the above-described valve. A positive seal, easy flow control, or continuous flow is available to the operator by simply moving the ball within the flexible walls of the valve housing. The valve has only a single moving part and is easily constructed by either a molding or a dipping process. The valve can be made from a wide choice of materials, which is particularly important where it is to be used in chemical work, it being necessary to choose a material which is inert relative to the particular reagent with which the valve is being used. The valve may, if desired, be molded integrally with the tubing or conduit in which it is being used. However, it is usually more practical to secure the valve in the tubing or conduit with which it is to be used by any one of a number of standard coupling means.

It is to be understood that the term "ball" as employed throughout the specification and in the appended claims includes not only a body of spherical shape but any shape which functions substantially in the manner described.

While, in accordance with the patent statutes, one best known embodiment of the invention has been described herein, it is to be particularly understood that applicant is not to be limited thereto or thereby, but that the scope of the invention is defined in the appended claims.

What is claimed is:

1. A valve structure of the ball-check type comprising a flexible valve body having an upper and a lower compartment, a ball within said valve body, an interconnecting throat between said compartments normally restricting the movement of the ball from one compartment to the other and at the same time permitting substantially free flow of fluid through the valve when the ball is in the upper compartment, the inner periphery of the throat being substantially equal to the circumference of the ball to enable the ball to pass through the throat when distorted to circular shape in section, and a valve seat in the lower compartment against which the ball seats when it is in the lower compartment.

2. A valve structure of the ball-check type comprising a flexible valve body having an upper and a lower compartment, a ball within said valve body, an interconnecting elliptical throat between said compartments normally restricting the movement of the ball from one compartment to the other and at the same time permitting substantially free flow of fluid through the valve when the ball is in the upper compartment, the inside periphery of the throat being substantially equal to the circumference of the ball to permit the ball to be forced from one compartment to the other when the throat is distorted and pressure applied to the ball, and a valve seat in the lower compartment against which the ball seats when it is in the lower compartment.

3. In a valve of the ball-check type, a flexible valve body, an inlet at one end and an outlet at the other end of the body, a ball within said body adapted to seat at the outlet end of said valve to cut off flow of fluid through the valve, a plurality of flexible fingers projecting inwardly within said valve body and carried by the walls thereof whereby the ball is constrained either in non-sealing relation to the inlet end or in sealing relation to the outlet end of said valve.

4. In a valve of the ball-check type, a flexible valve body, an inlet at one end and an outlet at the other end of the body, a ball within said body adapted to seat at the outlet end of said valve to cut off flow of fluid through the valve, a plurality of flexible fingers projecting inwardly within said valve body and carried by the walls thereof substantially intermediate said inlet and outlet ends whereby the ball is constrained either in non-sealing relation to the inlet end or in sealing relation to the outlet end of said valve.

5. In a valve of the type described having an inlet and an outlet end, a valve body having flexible walls, said valve body including three compartments, a ball within said valve body adapted to pass from one compartment to the other, flexible means between said compartments restricting the movement of said ball, the compartment adjacent said outlet end fitting snugly and in sealing relation around said ball when said ball is urged into said compartment, a valve seat associated with the middle compartment, the middle compartment fitting loosely around the ball and allowing it to seal against the valve seat, the flexible means between the middle and upper compartments releasably holding the ball in the upper compartment in non-sealing relation.

6. The combination in a valve of a flexible housing having substantially an hour glass shape providing an upper and lower compartment, a ball within the housing and movable from one compartment to the other by flexing the housing, an outlet on the lower compartment against which the ball seals when it is in the lower compartment, an endless corrugated throat between the compartments on which the ball rests in non-sealing position when it is in the upper compartment, and an inlet to the upper compartment.

7. The combination in a valve of a housing of thin-walled, rubber-like material shaped to form at least a pair of compartments, a throat connecting the compartments, an inlet associated with one compartment, an outlet associated with another compartment, a ball in the housing and movable from one compartment to the other by squeezing the housing, a valve seat associated with the compartment having the outlet and against which the ball seals when it is in the outlet compartment, the throat being so constructed and arranged as to hold the ball in non-sealing position in the inlet compartment.

8. The combination in a valve of a housing of thin-walled, resilient material shaped to form at least a pair of compartments, a throat connecting the compartments, an inlet associated with one compartment, an outlet associated with another compartment, a ball in the housing and movable from one compartment to the other by stretching the housing, a valve seat associated with the compartment having the outlet and against which the ball seals when it is in the outlet compartment, the throat being so constructed and arranged as to hold the ball in non-sealing position in the inlet compartment, a ball in the housing and adapted to be positioned in either compartment, and means positioned between the compartments for releasably holding the ball in non-sealing relation in the inlet compartment.

9. The combination in a valve of a housing of thin-walled, resilient material shaped to form at least a pair of compartments, a throat connecting the compartments, an inlet associated with one compartment, an outlet associated with another compartment, a ball in the housing and movable from one compartment to the other by squeezing the housing, a valve seat associated with the compartment having the outlet and against which the ball seals when it is in the outlet compartment, the throat being so constructed and arranged as to hold the ball in non-sealing position in the inlet compartment, a ball in the housing and adapted to be positioned in either compartment, said outlet compartment being of a size and shape to resiliently hold the ball against the valve seat means.

10. The combination defined in claim 7 wherein the ball has a greater circumference than the inner periphery of the throat.

11. In combination in a valve, a flexible housing, a ball in the housing, a valve seat in the housing against which the ball is adapted to seat in sealing relation, and a shelf of other than circular shape in section in the housing adapted to support the ball in non-sealing position in housing, the housing being adapted to be flexed to move the ball to either the valve seat or to the shelf.

12. A valve as in claim 11 wherein the shelf has an elongate aperture therein through which the ball may pass, and the circumferential length of the wall of the aperture exceeds the circumference of the ball.

References Cited in the file of this patent

UNITED STATES PATENTS

| Number | Name | Date |
| --- | --- | --- |
| 1,111,642 | Brucker | Sept. 22, 1914 |
| 1,629,838 | Perdue | May 24, 1929 |
| 2,540,403 | Meyers | Feb. 6, 1951 |
| 2,617,624 | Annis | Nov. 11, 1952 |

FOREIGN PATENTS

| Number | Country | Date |
| --- | --- | --- |
| 897,567 | France | 1945 |